United States Patent
Kipping et al.

(10) Patent No.: US 6,831,660 B1
(45) Date of Patent: Dec. 14, 2004

(54) METHOD AND APPARATUS FOR GRAPHICS WINDOW CLIPPING MANAGEMENT IN A DATA PROCESSING SYSTEM

(75) Inventors: Debra Ann Kipping, North Richland Hills, TX (US); Wei Kuo, Austin, TX (US); Mark Richard Nutter, Austin, TX (US); George F. Ramsay, III, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 937 days.

(21) Appl. No.: 09/595,349

(22) Filed: Jun. 15, 2000

(51) Int. Cl.[7] .......................... G09G 5/14; G06T 15/30
(52) U.S. Cl. ...................................... 345/625; 345/628
(58) Field of Search ................................ 345/620–628

(56) References Cited

U.S. PATENT DOCUMENTS

| | | | | |
|---|---|---|---|---|
| 4,982,345 A | * | 1/1991 | Callahan et al. | 345/628 |
| 5,012,433 A | * | 4/1991 | Callahan et al. | 345/623 |
| 5,485,562 A | * | 1/1996 | Narayanaswami | 345/628 |
| 6,052,129 A | * | 4/2000 | Fowler et al. | 345/620 |

FOREIGN PATENT DOCUMENTS

| | | | |
|---|---|---|---|
| JP | 62-069372 | 3/1987 | G06F/15/62 |
| JP | 63-155322 | 6/1988 | G06F/3/14 |
| JP | 02-144779 | 6/1990 | G06F/15/72 |
| JP | 03-121677 | 5/1991 | G06F/15/72 |
| JP | 04-323722 | 11/1992 | G06F/3/14 |
| JP | 06-274643 | 9/1994 | G06F/15/72 |
| JP | 07-271339 | 10/1995 | G09G/5/24 |
| JP | 08-069517 | 3/1996 | G06T/1/00 |
| JP | 2000-067207 | 3/2000 | G06T/1/00 |

* cited by examiner

*Primary Examiner*—Jeffery Brier
(74) *Attorney, Agent, or Firm*—Duke W. Yee; Mark E. McBurney; Wayne P. Bailey

(57) ABSTRACT

A method and apparatus in a data processing system for processing graphics data. A set of clip areas defining a window for use in clipping graphics data is identified in which a portion of the graphics data is obscured. A clip area in a first hardware clipper is set, wherein the clip area encompasses the window to process the graphics data. The graphics data within the first clip area is graphics data to be displayed. A no clip area is set in a second hardware clipper, wherein the no clip area encompasses the portion and wherein which graphics data in the second clip area is to remain undisplayed. The graphics data is sent to the first hardware clipper and the second hardware clipper.

31 Claims, 10 Drawing Sheets

```
/* IBM_PROLOG_BEGIN_TAG                                            */
/* This is an automatically generated prolog.                      */
/*                                                                 */
/* gos43T src/gos/2d/XTOP/programs/Xserver/ddx/sonddx/common/sonclip.c 1.1 */
/*                                                                 */
/* IBM CONFIDENTIAL                                                */
/*                                                                 */
/* OBJECT CODE ONLY SOURCE MATERIALS                               */
/*                                                                 */
/* (C) COPYRIGHT International Business Machines Corp. 1999,2000   */
/* All Rights Reserved                                             */
/*                                                                 */
/* The source code for this progam is not published or otherwise   */
/* divested of its trade secrets, irrespective of what has been    */
/* deposited with the U.S. Copyright Office.                       */
/*                                                                 */
/* IBM_PROLOG_END_TAG                                              */
#include <X.h>
#include <Xproto.h>
#include <scrnintstr.h>
#include <pixmapstr.h>
#include <region.h>
#include <regionstr.h>
#include <gcstruct.h>
include <cfb.h> include <aixPrivates.h>
include <AIX.h>

/*-----------------------------------------------------------------
 * Sonora includes
 *-----------------------------------------------------------------
 */
#include <sonorarastop.h>
#include <sondefines.h>
#include <sonextern.h>
#include <songc.h>
#include <songlob.h>
#include <sonmacros.h>
#include <sonpriv.h>
#include <sonrasflags.h>
#include <sontrace.h>
#include <sontrans.h>
#include <sonwin.h>
```

```
/******************************************************************************
 * NAME:       sonSetWinClip
 *
 * FUNCTION:   This routine sets the window origin and sets up clipping for
 *             the window.
 *
 * INPUT:      pScreen    Pointer to the screen
 *             pWin       Pointer to the destination window (not needed when
 *                        fullScreen is TRUE)
 *             pGC        Pointer to the GC (not needed when fullScreen is
 *                        TRUE)
 *             fullScreen If TRUE, the window orgin will be set to (0,0)
 *                        and a single full screen hardware clipper will
 *                        be set up
 * RETURNS:    None
 ******************************************************************************/
```
⎬ 802

```
void sonSetWinClip (pScreen, pWin, pGC, fullScreen)
    ScreenPtr    pScreen;
    WindowPtr    pWin;
    GCPtr        pGC;
{
    RegionPtr    pClip;
    RegionRec    clipInv;     /* contains the inverse clip */
    Bool         clipND;      /* clip no draw */
    Bool         overlap;
    int          numClipRects;
    BoxPtr       ClipRect;
    int          maxFit;      /* Max number of rectangles that will fit into
                                  the current fifo                         */
    int          numRects;    /* Number of rectangles to copy into the fifo */
    int          i;
    sonDefines;
```
⎬ 804

```
    TEST_TO_TRACE ("XMT_B", _rcx) ;

X_TRACE3 ("Enter sonSetWinClip (pScr=0x%x, pWin=0x%x, pGC=0x%x, full=%d) \n",
              pScreen, pWin, pGC, fullScreen) ;

GET_FIFO_INFO () ;

if (!fullScreen) {
        /*--------------------------------------------------------
         * Update the window orgin.
         *------------------------------------------------------*/
        SET_WINDOW_ORIGIN (pWin->drawable.x, pWin->drawable.y) ;
```
⎬ 806

FIG. 8C

```
/*-----------------------------------------------
 * Get a pointer to the composite clip, which is in window
 * coordinates.
 *----------------------------------------------*/
pClip = (RegionPtr) GET_COMPOSITE_CLIP (pGC) ;                        }808 numClipRects = REGION_NUM_RECTS (pClip) ;
ClipRect     = REGION_RECTS (pClip) ;

/*-----------------------------------------------
 * If there are more regions than hardware clippers, check the
 * inverse of the clip region to see if the HW clippers can be used
 *----------------------------------------------*/
if ( numClipRects > NUM_HW_CLIPPERS ) {
   ( * pScreen->RegionInit )         ( &clipInv, NullBox, 0 ) ;
   ( * pScreen->Inverse )            ( &clipInv, pClip, &pClip->extents ) ;      }810
   ( * pScreen->RegionValidate )     ( &clipInv, &overlap ) ;

/*-----------------------------------------------
    * If the inverse regions is < than the number of hardware clippers,
    * set these regions to clip no draw.
    * Note: < NUM_HW_CLIPPERS since REGION_NUM_RECTS ( &clipInv ) does
    *       not contain the clip draw region
    *----------------------------------------------*/
   if ( REGION_NUM_RECTS ( &clipInv ) < NUM_HW_CLIPPERS ) {
      numClipRects = REGION_NUM_RECTS ( &clipInv ) ;
      numClipRects++; /* Add one for the clip draw region */
      clipND       = TRUE;
      ClipRect     = REGION_RECTS ( &clipInv ) ;                                 }812
   }else{
      ( * pScreen->RegionDestroy ) ( &clipInv ) ;
   }
}else{
   clipND       = FALSE;
}

SET_RECT_ATTRS (pScrnPriv->dotRect | RECTS_IN_WIN_COORDS) ;

if (numClipRects   <=  NUM_HW_CLIPPERS ) {
```

FIG. 8D

```
/*--------------------------------------------------
 * There are less than 6 clip regions,
 * so set up the hardware clippers.
 *--------------------------------------------------*/
uint nibble_enables, clipper_enables;
switch (numClipRects) {
  case 1:
      nibble_enables  = E29 | E30 | E31;
      clipper_enables = ENABLE_CLIPPER_0;
      break;
  case 2:
      nibble_enables  = E27 | E28 | E29 | E30 | E31;
      clipper_enables = ENABLE_CLIPPER_0 | ENABLE_CLIPPER_1;
      break;
  case 3:
      nibble_enables  = E25 | E26 | E27 | E28 | E29 | E30 | E31;
      clipper_enables = ENABLE_CLIPPER_0 | ENABLE_CLIPPER_1 |
                        ENABLE_CLIPPER_2;
      break;
  case 4:
      nibble_enables  = E23 | E24 | E25 | E26 | E27 | E28 | E29 |
                        E30 | E31;
      clipper_enables = ENABLE_CLIPPER_0 | ENABLE_CLIPPER_1 |
                        ENABLE_CLIPPER_2 | ENABLE_CLIPPER_3;
      break;
  case 5:
      nibble_enables  = E21 | E22 | E23 | E24 | E25 | E26 | E27 |
                        E28 | E29 | E30 | E31;
      clipper_enables = ENABLE_CLIPPER_0 | ENABLE_CLIPPER_1 |
                        ENABLE_CLIPPER_2 | ENABLE_CLIPPER_3 |
                        ENABLE_CLIPPER_4;
      break;
}
```
⎫814

FIG. 8F

```
/*--------------------------------------------------
 * If the clip plane was previously used, disable it.
 *--------------------------------------------------*/
    if (pScrnPriv->clipMethod == CLIP_PLANE) {
        DISABLE_CLIP_PLANE () ;
        pScrnPriv->clipMethod = HARDWARE_CLIPPERS;
    }
} else {
```
⎫822

FIG. 8E

```
/*---------------------------------------------
 * If we are going to use clip no draw, set clippers 1 2 3 4 to
 * clip no draw. Clipper 0 is still set to clip draw.
 *---------------------------------------------*/
if ( clipND ) {
    clipper_enables &= CLIPPER_1234ND_MASK;
}                                                                        816

FIFO_WRITE_WORD (fifoAddr, WIN_CLIP | nibble_ enables) ;
FIFO_WRITE_WORD (fifoAddr, CLIPPERS_IN_WIN_COORDS | clipper_enables) ;

/*---------------------------------------------
 * If we are going to use clip no draw, set pClip->extents to be
 * the clip draw region
 *---------------------------------------------*/
if ( clipND ) {
    FIFO_WRITE_WORD (fifoAddr, Pack32(pClip->extents.x1,
                                     pClip->extents.y1) ) ;
    FIFO_WRITE_WORD (fifoAddr, Pack32(pClip->extents.x2 - 1,
                                     pClip->extents.y2 - 1) ) ;
    numClipRects--;
}
for ( ; numClipRects > 0; numClipRects--, ClipRect++) {                  818

/*---------------------------------------------
     * Sonora: Send the upper left coordinate pair, then
     *         the lower right. 1 must be subtracted from
     *         each of the lower right coordinates before
     *         sending them to the adapter.
     *---------------------------------------------*/
    FIFO_WRITE_WORD (fifoAddr, Pack32(ClipRect->x1, ClipRect->y1) ) ;
    FIFO_WRITE_WORD (fifoAddr, Pack32(ClipRect->x2 - 1,
                                     ClipRect->y2 - 1) ) ;
}
/*---------------------------------------------
 * Free up memory
 *---------------------------------------------*/
if ( clipND ) {                                                          820
    ( * pScreen->RegionDestroy ) ( &clipInv ) ;
}
```

METHOD AND APPARATUS FOR GRAPHICS WINDOW CLIPPING MANAGEMENT IN A DATA PROCESSING SYSTEM

BACKGROUND OF THE INVENTION

1. Technical Field

The present invention relates generally to an improved data processing system and in particular to a method and apparatus for processing graphics data. Still more particularly, the present invention provides a method and apparatus for window clipping.

2. Description of Related Art

Data processing systems, such as personal computers and work stations, are commonly utilized to run computer-aided design (CAD) applications, computer-aided manufacturing (CAM) applications, and computer-aided software engineering (CASE) tools. Engineers, scientists, technicians, and others employ these applications daily. These applications involve complex calculations, such as finite element analysis, to model stress in structures. Other applications include chemical or molecular modeling applications. CAD/CAM/CASE applications are normally graphics intensive in terms of the information relayed to the user. Data processing system users may employ other graphics intensive applications, such as desktop publishing applications. Generally, users of these applications require and demand that the data processing systems be able to provide extremely fast graphics information.

The processing of a graphics data stream to provide a graphical display on a video display terminal requires an extremely fast graphics system to provide a display with a rapid response. In these types of graphics systems, primitives are received for processing and display. A primitive is a graphics element that is used as a building block for creating images, such as, for example, a point, a line, an arc, a cone, or a sphere. A primitive is defined by a group of one or more vertices. An attribute is used to define how a primitive will be displayed. Attributes include, for example, line style, color, and surface texture. A vertex defines a point, an end point of an edge, or a corner of a polygon where two edges meet. Data also is associated with a vertex in which the data includes information, such as positional coordinates, colors, normals, and texture coordinates. Commands are sent to the graphics system to define how the primitives and other data should be processed for display.

With the large amounts of data and computations involved in processing graphics data, especially with three-dimensional applications, many of these computations have been offloaded from the central processing units to a graphics adapter. Within these graphics systems, a graphics pipeline located in the graphics adapter is used to process this graphics data. With a pipeline, the graphics data processing is partitioned into stages of processing elements in which processing data may be executed sequentially by separate processing elements.

Within these processing elements, a clipping function is typically implemented in which pixels for a primitive located within a clip area are rendered, while pixels for the primitive outside of the clip area are not rendered. The hardware implementing the clipping function is often referred to as a hardware clipper. Often, more than one clip area is used to render the correct pixels on a display. With some high-end graphics adapters, multiple hardware clippers are present to clip graphics primitives. Clipping primitives, such as lines and segments, are faster using hardware clippers, rather than software clippers.

In some cases, the number of clipping areas exceed the number of hardware clippers present in a graphics adapter. Presently, in this situation, the clipping function is handled by software or clip planes, rather than by hardware clipper. As a result, the performance and speed in displaying images is reduced as compared to using hardware clippers. It is possible to increase the number of hardware clippers, but the increase compounds the complexity in designing the graphics adapter and raises the cost of the graphics adapter. Additionally, such a solution is not applicable to graphics adapters already manufactured and in use.

Therefore, it would be advantageous to have a method and apparatus for providing a clipping function in which software clipping or clip planes is avoided.

SUMMARY OF THE INVENTION

The present invention provides a method and apparatus in a data processing system for processing graphics data. A set of clip areas defining a window for use in clipping graphics data is identified in which a portion of the graphics data is obscured. A clip area in a first hardware clipper is set, wherein the clip area encompasses the window to process the graphics data. The graphics data within the first clip area is graphics data to be displayed. A no clip area is set in a second hardware clipper, wherein the no clip area encompasses the portion and wherein which graphics data in the second clip area is to remain undisplayed. The graphics data is sent to the first hardware clipper and the second hardware clipper.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 8A–8F are diagrams of code used to provide window clipping management in accordance with a preferred embodiment of the present invention.

DETAILED DESCRIPTION OF THE PREFERRED EMBODIMENT

Figure 1:
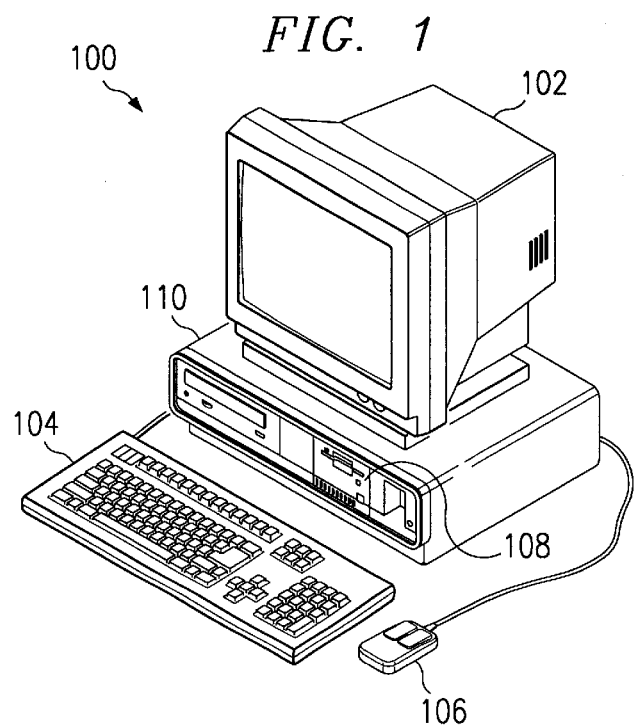
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
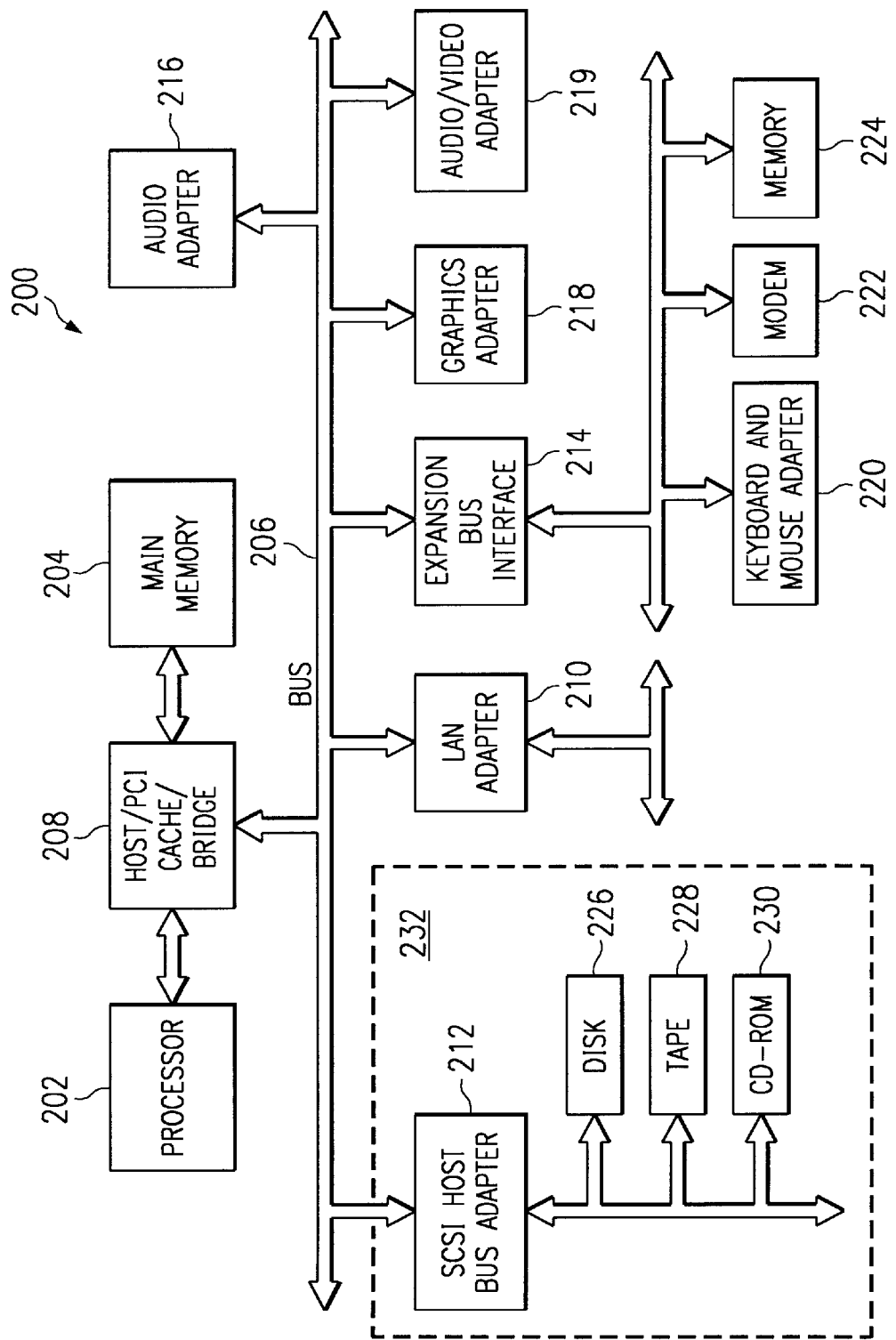
FIG. 2 is a block diagram illustrating a data processing system in which the present invention may be implemented.

With reference now to FIG. 2, a block diagram illustrating a data processing system in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. The processes of the present invention may be used to manage rendering of data by graphics adapter 218 or audio/video adapter 219.

Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device which is configured with ROM and/or flash ROM in order to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

Figure 3:
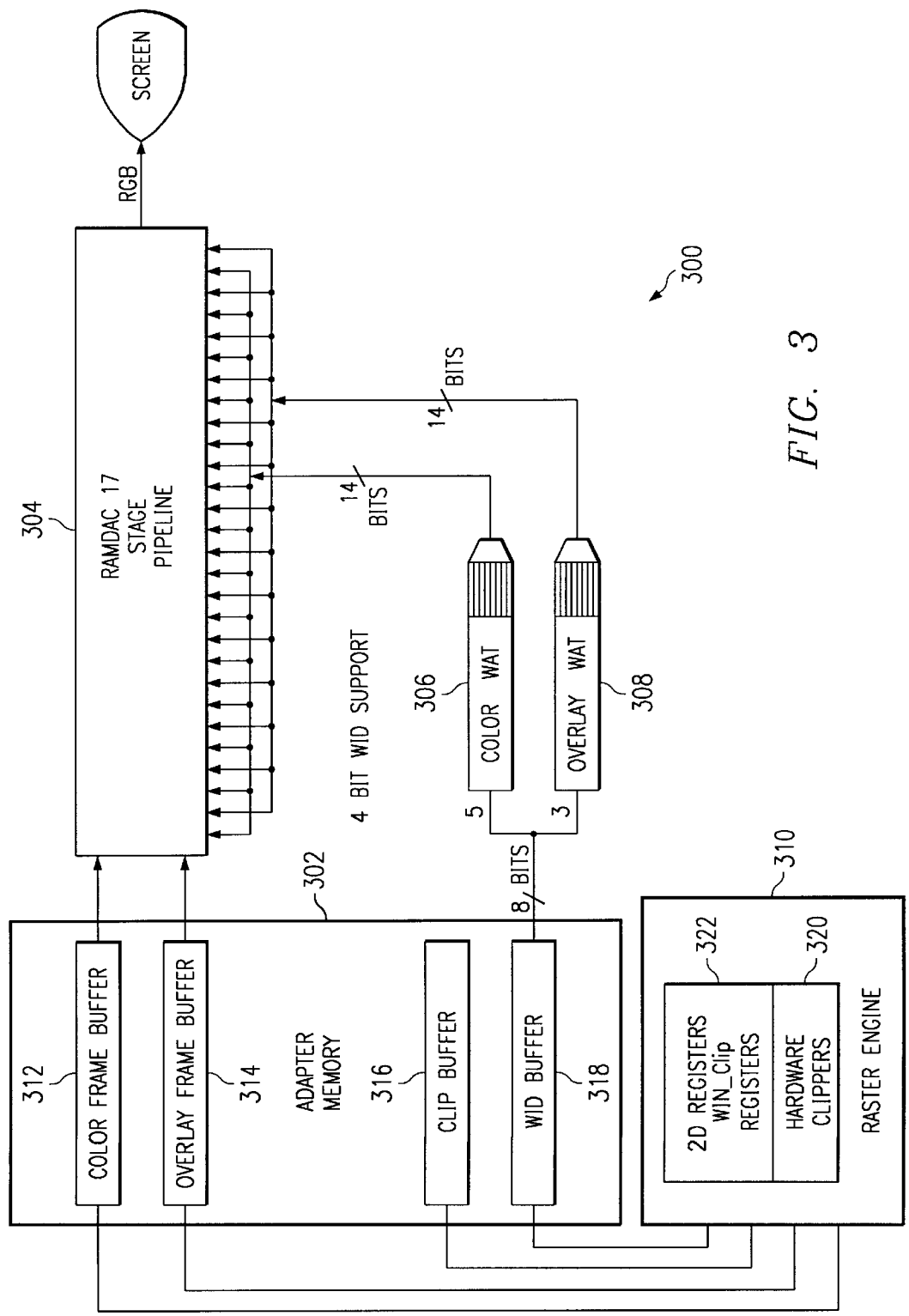
FIG. 3 is a block diagram illustrating a graphics adapter in accordance with a preferred embodiment of the present invention.

Turning next to FIG. 3, a block diagram illustrating a graphics adapter is depicted in accordance with a preferred embodiment of the present invention. Graphics adapter 300 is an example of a graphics adapter, such as graphics adapter 218 in FIG. 2. Graphics adapter 300 includes an adapter memory 302, a random access memory digital to analog converter (RAMDAC) 304, a color WAT table 306, an overlay WAT table 308, and raster engine 310. Adapter memory 302 includes a color frame buffer 312, an overlay frame buffer 314, clip buffer 316, and a WID buffer 318. The two frame buffers contain pixels, which are sent to RAMDAC 304 for output to a display device. RAMDAC 304 is a graphics controller chip that maintains the color palette and converts data from memory into analog signals for a display device.

WID buffer 318 contains WIDs that are used as an index into color WAT table 306 and overlay WAT table 308. Each of these WAT tables describes how a pixel will be rendered on a display device.

Clip buffer 316 contains clip planes, which are used as a mask to clip graphic primitives before the raster stores into the frame buffer 310. Using hardware clip planes is not as fast as the hardware clippers, but it is usually faster than clipping the graphic primitives in software. Raster engine 310 includes hardware clippers 320. A hardware clipper processes graphics data to determine whether the graphics data should be displayed. Before a pixel is written to a frame buffer, such as color frame buffer 312, the location of the pixel is compared to the region extents of the region set for the window clipper. The comparison determines if the location of the pixel is outside, on, or inside the region. In these examples, the pixel is not written to the frame buffer if the address is not contained on or inside the draw region or if the pixel lies on or inside a no draw region. A draw region is a region defined in which pixels located on or inside the region should be displayed, while a no draw region is a region defined in which pixels located on or inside the region should not be displayed. Typically, these regions are rectangular in form. In these examples, hardware clippers 320 implement a clipping process or algorithm in hardware to perform these functions. More information on clipping processes may be found in Foley, et al. *Computer Graphics Principles and Practice*, Second Edition, Addison-Wesley Publishing Company, Inc., 1997, ISBN 0-201-84840-6.

WIN_CLIP registers 322 provides support for setting window clipping in hardware clippers 320 within raster engine 310. WIN_CLIP registers 322 are 2D registers within raster engine 310. The 2D registers are all the graphic registers that pertain to 2D rendering. The WIN_CLIP registers 322 are used to initialize hardware clippers 320. Other 2D registers are, for example, DRW_LINE (Draw Line) and DRW_RECT (Draw Rectangle). Each register within WIN_CLIP registers 322 is associated with a hardware clipper. The register may be set to a "clip draw" or a "clip no draw" setting. In a clip draw setting, the hardware clipper will display graphics data, such as primitives, located within the clip region being processed by the hardware clipper. In this case, the clip region also is referred to as a draw region. In a clip no draw setting, graphics data located within the clip region will be undisplayed when processed by the hardware clipper. With a clip no draw setting, the clip region also is referred to as a no draw region.

It is desirable to use WIN_CLIP registers 322 for clipping functions instead of clip planes in clip buffer 316.

Although a particular configuration of elements is illustrated in FIG. 3, this configuration is not meant to imply architectural limitations as to the hardware in which the mechanism of the present invention may be used.

The mechanism of the present invention allows for management of clipping functions such that when the number of clip regions is greater than the number of registers within WIN_CLIP registers 322, hardware clipping using hardware clippers 320 may still occur. When a portion of a window is obscured by a small window, only two clipping regions are required in accordance with a preferred embodiment of the present invention. In this situation, one clipping region is an inclusive region. This inclusive region is the window that is obscured. The other clipping region is an exclusive region. This clipping region is for the obscuring window.

For the inclusive region, a WIN_CLIP register is used to set a hardware clipper. The graphics data located within the inclusive region is data that is to be displayed. For the exclusive region, another WIN_CLIP register is used to set a second hardware clipper. The graphics data located within the exclusive region is not to be displayed. The setting in this second hardware clipper is a "no clip" setting to cause this graphics data to be undisplayed. If additional obscuring regions are present, additional hardware clippers may be set to handle these regions.

Figure 4:
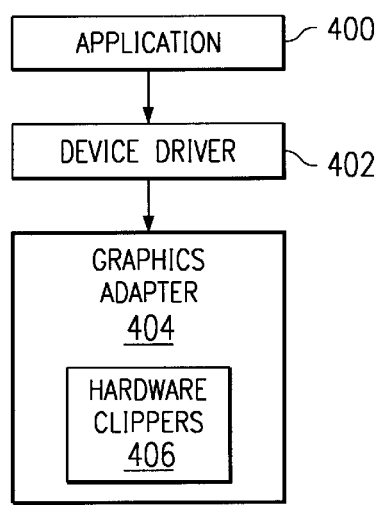
FIG. 4 is a diagram illustrating components used in graphics window clipping management in accordance with a preferred embodiment of the present invention.

Turning now to FIG. 4, a diagram illustrating components used in graphics window clipping management is depicted in accordance with a preferred embodiment of the present invention. The components illustrated in FIG. 4 are examples of those that may be found in a data processing system, such as data processing system 200 in FIG. 2. Application 400 and device driver 402 may be found in the form of instructions located in a memory or storage device within data processing system 200 in FIG. 2. Graphics adapter 404 may be implemented as graphics adapter 208 in FIG. 2.

In these examples, clip rectangles or other types of clip areas may be identified by application 400 for a scene or window that is to be rendered for display. These clip regions are sent to device driver 402 along with other graphics information, such as primitives for the scene or window. A device driver is a program routine that links a peripheral device to the operating system. A device driver is written by programmers who understand the detailed knowledge of the device's command language and characteristics and contains the precise machine language necessary to perform the functions requested by the application. In this example, device driver 402 is a graphics device driver used to send graphics data and commands to graphics adapter 404. Device driver 402 identifies clip rectangles or clip areas defining a window in which a portion of the graphics data is obscured. Device driver 402 sends the appropriate commands or calls to graphics adapter 404 to set a hardware clipper within hardware clippers 406 to set a clip area encompassing the window formed by the set of clip areas. The graphics data within this area is to be displayed. Additionally, a clip area in which graphics data is to be displayed also is identified. Device driver 402 sends an appropriate call or command to graphics adapter 404 to set another hardware clipper to set a no clip area in which graphics data in this area is to remain undisplayed.

Figure 5:
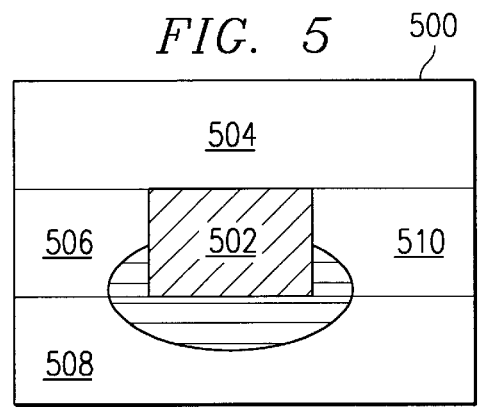
FIG. 5 is a diagram illustrating clipping using a known process.

Turning next to FIG. 5, a diagram illustrating clipping using a known process is illustrated. In this example, window 500 is obscured by smaller window 502. Using currently known processes, four clip regions, clip region 504, 506, 508, and 510 are used to display the image formed by window 500 and window 502. This scheme requires the use of four hardware clippers.

Figure 6:
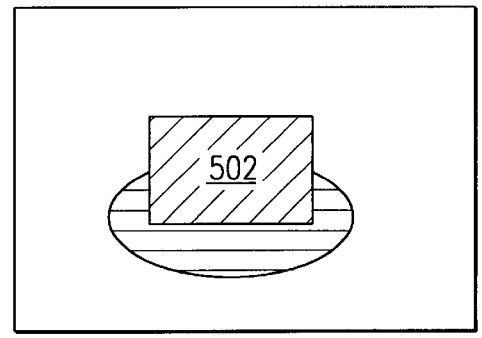
FIG. 6 is a diagram of a window clipping management mechanism for reducing the number of hardware clippers required to process an image in accordance with a preferred embodiment of the present invention.

With reference now to FIG. 6, a diagram of a window clipping management mechanism for reducing the number of hardware clippers required to process an image are depicted in accordance with a preferred embodiment of the present invention. Using the mechanism of the present invention, window 500 and window 502 may be processed using only two clip regions. A clip draw region is set for window 500. A clip no draw region is set for the obscuring window, window 502. In this manner, only two clip regions are used, requiring only two hardware clippers. A clip no draw region may be set for each additional obscuring window or other type of regions. Thus, if an adapter contains seven hardware clippers, the mechanism of the present invention allows for up to six obscuring regions to be processed before requiring the use of clip planes.

Figure 7A:
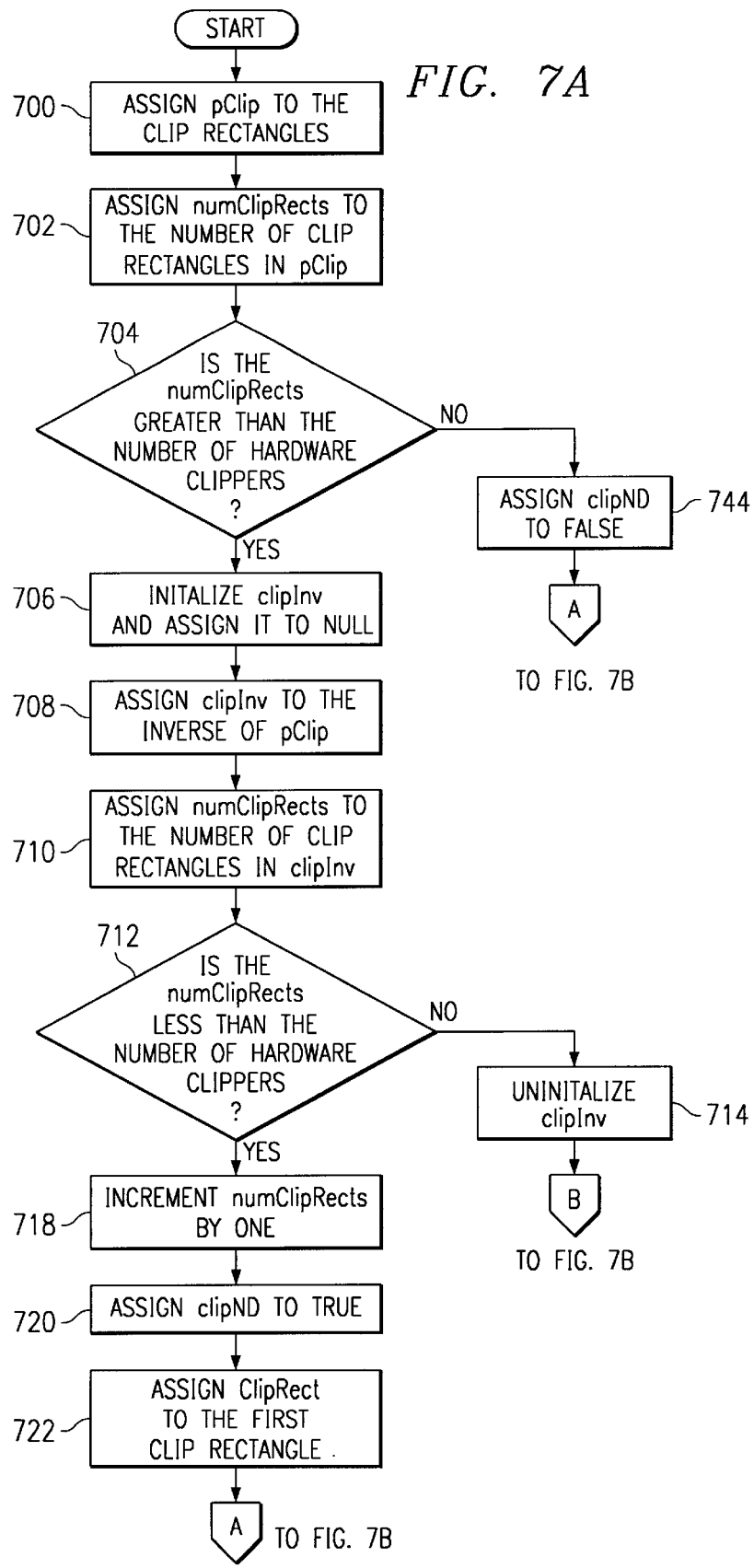
FIGS. 7A and 7B, is a flowchart of a process for window clipping management in accordance with a preferred embodiment of the present invention.
Figure 7B:
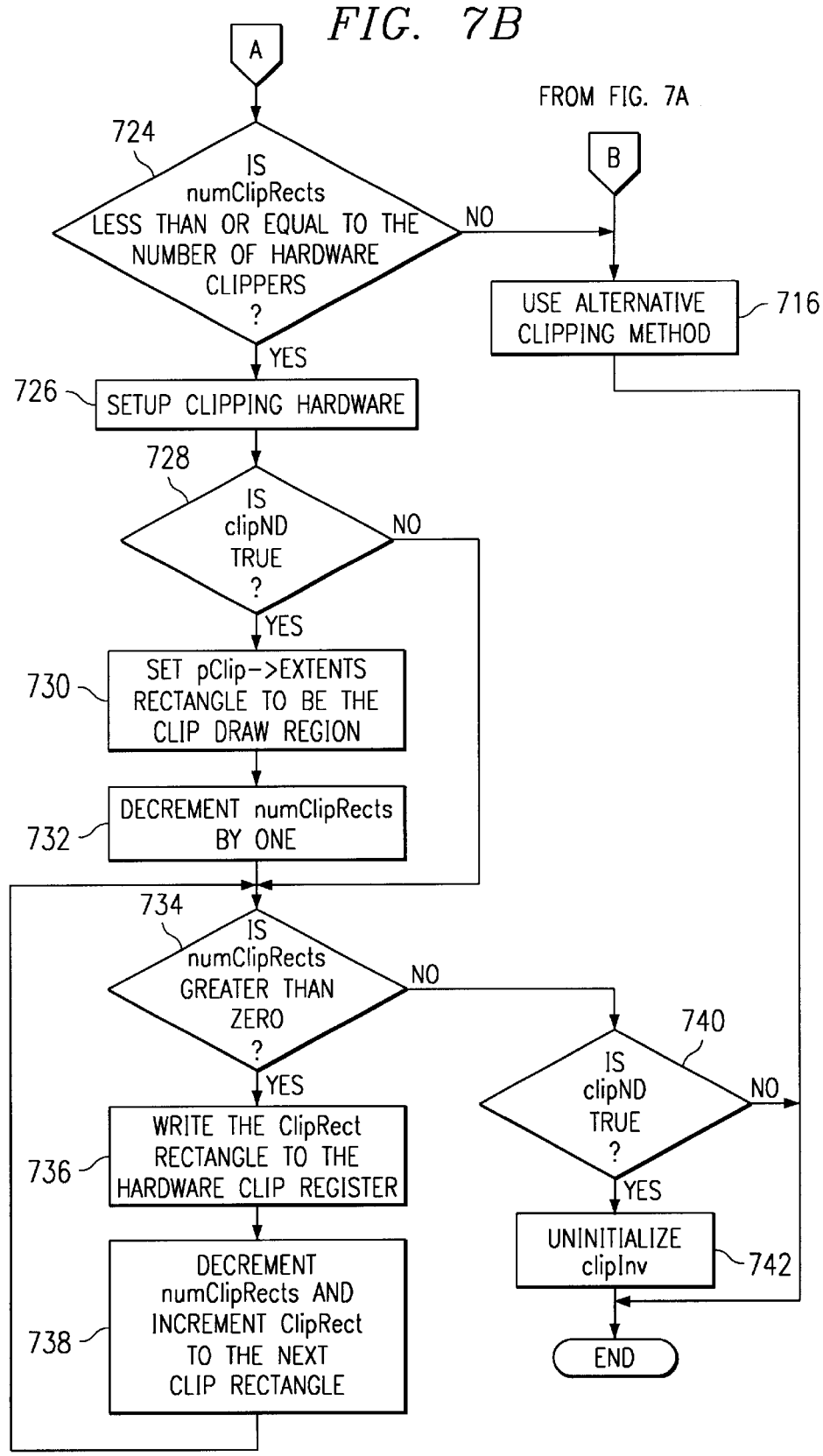

Turning next to FIGS. 7A and 7B, a flowchart of a process for window clipping management is depicted in accordance with a preferred embodiment of the present invention.

The process begins by assigning pClip to the clip rectangles (step 700). In this example, pClip is a pointer to the composite clip containing the clip rectangles. Next, the variable numClipRects is assigned to the number of rectangles in pClip (step 702). A determination is then made as to whether the variable numClipRects is greater than the number of hardware clippers in the graphics hardware (step 704). This step is used to determine whether there are more regions than hardware clippers present. If the number of clip rectangles in the variable numClipRects is greater than the number of hardware clippers, then the variable clipInv is initialized and set to null (step 706). This variable is used to track the number of inverse regions. Then, the variable clipInv is assigned to the inverse of pClip (step 708). For example, the inverse of FIG. 5 is illustrated in FIG. 6 where window 502 is the inverse rectangle of FIG. 5. The variable numClipRects is set to the number of clip rectangles in the variable clipInv (step 710).

Thereafter, a determination is made as to whether the variable numClipRects is less than the number of hardware clippers (step 712). If this variable is not less than the number of hardware clippers, then the variable clipInv is uninitialized (step 714). In this case, the number of hardware clippers present is insufficient to support hardware clipping. An alternative clipping method is used to process the graphics data (step 716) with the process terminating thereafter. This alternative process may be, for example, using software clippers or a hardware clip plane.

On the other hand, if in step 712 numClipRects is less than the number of hardware clippers, then the variable numClipRects is incremented by one (step 718). Prior to being incremented by one, the variable numClipRects indicates the number of inverse or clip no draw regions. The incrementing of this variable by one is used to include the clip draw region. Next, the variable clipND is set equal to true (step 720). This variable is set equal to true to indicate that clip no draw rectangles will be used. ClipRect is assigned to the first clip rectangle (step 722). ClipRect is a pointer to a clip rectangle.

Next, a determination is made as to whether numClipRects is less than or equal to the number of hardware clippers (step 724). If this variable is greater than the number of hardware clippers, the process proceeds to step 716 as described above. If the variable of numClipRects is less than or equal to the number of hardware clippers, then the clipping hardware is set up (step 726). Step 726 sets up the first part of WIN_CLIP which describes how many clip rectangles will be used and which ones will be set to clip draw or clip no draw.

Then, a determination is made as to whether clipND is true (step 728). If clipND is true, then pClip->extents rectangle is set to the clip draw region (step 730). The pClip->extents rectangle contains the minimum and maximum of the clip regions. The minimum is the smallest x,y value and the maximum is the largest x,y value. This step basically sets the hardware clipper to process graphics data within the clip region. The variable numClipRects is then decremented by one (step 732). A determination is made as to whether the variable numClipRects is greater than zero (step 734). This step is used to determine whether all of the clip rectangles have been processed. If numClipRects is greater than zero, the rectangle pointed to by ClipRect is written to the hardware clip register (step 736). Then, the variable numClipRects is decremented, and ClipRect is incremented to point to the next clip rectangle for processing (step 738) with the process then returning to step 734 as described above.

With reference again to step 734, if the variable numClipRects is not greater than zero, then a determination is made as to whether then variable clipND is set equal to true (step 740). If clipND is true, then clipInv is uninitialized (step 742) with the process terminating thereafter. Otherwise, the process terminates.

Referring back to step 728, if clipND is not true, then the process then proceeds to step 734 as described above. Turning back to step 724, if the variable numClipRects is not less than or equal to the number of hardware clippers, the process proceeds to step 716.

With reference again to step 704, if the variable numClipRects is not greater than the number of hardware clippers, clipND is set equal to false (step 744). This indicates that clip no draw rectangles will not be used. In this situation, the number of clip rectangles required is less than or equal to the number of hardware clippers present.

Turning next to FIGS. 8A-8F, diagrams of code used to provide window clipping management is depicted in accordance with a preferred embodiment of the present invention. Code 800 is written in C. Line 802 in code 800 delineates the beginning of a routine to set the window origin and clipping for the window. Variables for this routine are defined in section 804. A window origin is set in section 806. Section 808 of code 800 is used to obtain a pointer to the composite clip, which is a collection of clip areas forming the clip region. These clip areas are in the form of rectangles in this example. In section 810, code 800 determines whether more clip regions are present than hardware clippers. In this section, if more regions are present than hardware clippers, the inverse of the clip regions is checked to see if the hardware clippers can be used. In section 812 of code 800, if the inverse regions are less than the number of hardware regions, these regions are set to a clip no draw state. Parameters used to set up hardware clippers are initialized in section 814. Section 816 sets up the first part of WIN_CLIP which describes how many clip rectangles will be used and which ones will be set to clip draw or clip no draw. One of the hardware clippers is set to clip draw for one of the regions. In section 818, the pClip->extents rectangles are set to the clip draw region and the remaining clip areas are written to WN_CLIP. Memory is freed up in section 820 and the clip plane is disabled in section 822.

Thus, the present invention provides an improved method and apparatus for graphics window clipping management. This management system provides for an ability to use hardware clippers even though the number of clipping regions may exceed the number of hardware clippers. This ability is provided through identifying an inclusive region and an exclusive region in which the inclusive region is an obscured window and the exclusive region is an obscuring window. In this manner, only two clip rectangles are defined rather than four clip rectangles. If additional exclusive regions are present, only one hardware clipper is required for each additional region. In this manner, the need for using a time consuming clip plane is avoided more often, especially when multiple windows are present in a display.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. If an additional window is added, seven hardware clippers are required.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for processing graphics data, the method comprising:
   identifying a set of clip areas defining a window for use in clipping graphics data in which a portion of the graphics data is obscured;
   setting a first clip area encompassing the window to process the graphics data by a first hardware clipper, wherein graphics data other than the obscured portion within the first clip area is to be displayed; and
   setting a second clip area encompassing the portion to process the graphics data by a second hardware clipper, wherein which graphics data in the second clip area is to remain undisplayed.

2. The method of claim 1, wherein the set of clip areas are a set of clip rectangles.

3. The method of claim 1, wherein the set of clip areas form a clip region, wherein the primitives within the clip regions are to be displayed.

4. The method of claim 1, wherein the portion is a first portion and wherein a second portion of the graphics data is obscured and further comprising:
   setting a third clip area encompassing the second portion to process the graphics data, wherein the graphics data in the second clip area is to remain undisplayed.

5. The method of claim 1, wherein the graphics data is at least one primitive.

6. The method of claim 1, wherein the step of setting a first clip area includes setting the first clip area in the first hardware clipper and wherein the step of setting a second clip area includes setting the second clip area in the second hardware clipper.

7. The method of claim 1, wherein the clip areas are set in a graphics adapter.

8. The method of claim 1, wherein the clip areas are set in the hardware clippers.

9. A method in a data processing system for processing graphics data, the method comprising:
   identifying a set of din areas defining a window for use in clinging graphics data in which a portion of the graphics data is obscured;
   initially determining whether the set of clip areas initially exceeds a number of hardware clippers; and
   if the set of clip areas initially exceeds the number of hardware clippers as determined by the initially determining step, (i) setting a first clip area encompassing the window to process the graphics data, wherein graphics data other than the obscured portion within the first clip area is to be displayed, and (ii) setting a second clip area encompassing the portion to process the graphics data, wherein which graphics data in the second clip area is to remain undisplayed.

10. A method in a data processing system for processing graphics data, the method comprising:
    identifying a set of clip areas defining a window for use in clipping graphics data in which a portion of the graphics data is obscured;
    setting a clip area in a first hardware clipper, wherein the clip area encompasses the window to process the graphics data and wherein graphics data within the clip area is to be displayed;
    setting a no clip area in a second hardware clipper, wherein the no clip area encompasses the portion and wherein which graphics data in the no clip area is to remain undisplayed; and
    sending the graphics data to the first hardware clipper and the second hardware clipper.

11. The method of claim 10, wherein the set of clip areas are a set of clip rectangles.

12. The method of claim 10, wherein the set of clip areas form a clip region, wherein the primitives within the clip regions are to be rendered.

13. A method in a data processing system for processing graphics data, the method comprising:
    identifying a set of clip areas defining a window for use in clipping graphics data in which a portion of the graphics data is obscured;
    initially determining whether the set of clip areas initially exceeds a number of hardware clippers; and
    if the set of clip areas initially exceeds the number of hardware clippers as determined by the initially determining step, (i) setting a clip area in a first hardware clipper, wherein the clip area encompasses the window to process the graphics data and wherein graphics data within the clip area is to be displayed, (ii) setting a no clip area in a second hardware clipper, wherein the no clip area encompasses the portion and wherein which graphics data in the no clip area is displayed, and (iii) sending the graphics data to the first hardware clipper and the second hardware clipper.

14. A data processing system comprising:
    a bus system;
    a memory connected to the bus containing a set of processor executable instructions;
    a graphics adapter connected to the bus, wherein the graphics adapter includes an output configured for connection to a display device;
    a processor unit connected to the bus, wherein the processor unit executes the set of processor executable instructions to identify a set of clip areas defining a window for use in clipping graphics data in which a portion of the graphics data is obscured, set a first clip area encompassing the window to processing the graphics data by a hardware clipper in which wherein graphics data other than the obscured portion within the first clip area is to be displayed, and to set a second clip area encompassing the portion to process the graphics data by another hardware clipper in which graphics data in the second clip area is to remain undisplayed.

15. The data processing system of claim 14, wherein the bus system comprises a single bus.

16. The data processing system of claim 14, wherein the bus system includes a set of buses interconnected by bridges.

17. A data processing system for processing graphics data, comprising:
    identifying means for identifying a set of clip areas defining a window for use in clipping graphics data in which a portion of the graphics data is obscured;
    first setting means for setting a first clip area encompassing the window to process the graphics data by a first hardware clipper, wherein graphics data other than the obscured portion within the first clip area is to be displayed; and
    second setting means for setting a second clip area encompassing the portion to process the graphics data by a second hardware clipper, wherein which graphics data in the second clip area is to remain undisplayed.

18. The data processing system of claim 17, wherein the set of clip areas are a set of clip rectangles.

19. The data processing system of claim 17, wherein the set of clip areas form a clip region and wherein the primitives within the clip regions are to be displayed.

20. The data processing system of claim 17, wherein the portion is a first portion and wherein a second portion of the graphics data is obscured and further comprising:
  third setting means for setting a third clip area encompassing the second portion to process the graphics data, wherein the graphics data in the second clip area is to remain undisplayed.

21. The data processing system of claim 17, wherein the graphics data is at least one primitive.

22. The data processing system of claim 17, wherein the first setting means includes setting a first clip area in the first hardware clipper and wherein the second setting means includes setting a second clip area in the second hardware clipper.

23. The data processing system of claim 17, wherein the clip areas are set in a graphics adapter.

24. The data processing system of claim 17, wherein the clip areas are set in the hardware clippers.

25. A data processing system for processing graphics data, comprising:
  identifying means for identifying a set of clip areas defining a window for use in clipping graphics data in which a portion of the graphics data is obscured;
  determining means for initially determining whether the set of clip areas initially exceeds a number of hardware clippers;
  first setting means for setting, if the set of clip areas initially exceeds the number of hardware clippers as determined by the determining means, a first clip area encompassing the window to process the graphics data, wherein graphics data other than the obscured portion within the first clip area is to be displayed; and
  second setting means for setting, if the set of clip areas initially exceeds the number of hardware clippers as determined by the determining means, a second clip area encompassing the portion to process the graphics data wherein which graphics data in the second clip area is to remain undisplayed.

26. A data processing system for processing graphics data, the method comprising:
  identifying means for identifying a set of clip areas defining a window for use in clipping graphics data in which a portion of the graphics data is obscured;
  first setting means for setting a clip area in a first hardware clipper, wherein the clip area encompasses the window to process the graphics data, wherein graphics data within the clip area is to be displayed;
  second setting means for setting a no clip area in a second hardware clipper, wherein the no clip area encompasses the portion and wherein which graphics data in the no clip area is to remain undisplayed; and
  sending means for sending the graphics data to the first hardware clipper and the second hardware clipper.

27. The data processing system of claim 26 further comprising:
  determining means for initially determining whether the set of clip areas exceeds a number of hardware clippers; and
  initiating means for initiating the first setting means and the second setting means only if the set of clip areas exceed the number of hardware clippers as determined by the determining means.

28. The data processing system of claim 26, wherein the set of clip areas are a set of clip rectangles.

29. The data processing system of claim 26, wherein the set of clip areas form a clip region and wherein the primitives within the clip regions are to be rendered.

30. A computer program product in a computer readable medium for use in a data processing system for processing graphics data, the computer program product comprising comprising:
  first instructions for identifying a set of clip areas defining a window for use in clipping graphics data in which a portion of the graphics data is obscured;
  second instructions for setting a first clip area encompassing the window to process the graphics data by a first hardware clipper, wherein graphics data other than the obscured portion within the first clip area is to be displayed; and
  third instructions for setting a second clip area encompassing the portion to process the graphics data by a second hardware clipper, wherein which graphics data in the second clip area is to remain undisplayed.

31. A computer program product in a computer readable medium for use in a data processing system processing graphics data, the computer program product comprising:
  first instructions for identifying a set of clip areas defining a window for use in clipping graphics data in which a portion of the graphics data is obscured;
  second instructions for setting a clip area in a first hardware clipper, wherein the clip area encompasses the window to process the graphics data, wherein graphics data within the clip area is to be displayed;
  third instructions for setting a no clip area in a second hardware clipper, wherein the no clip area encompasses the portion and wherein which graphics data in the no clip area is to remain undisplayed; and
  fourth instructions for sending the graphics data to the first hardware clipper and the second hardware clipper.

* * * * *

UNITED STATES PATENT AND TRADEMARK OFFICE
CERTIFICATE OF CORRECTION

PATENT NO.    : 6,831,660 B1
DATED         : December 14, 2004
INVENTOR(S)   : Kipping et al.

It is certified that error appears in the above-identified patent and that said Letters Patent is hereby corrected as shown below:

Column 9,
Line 41, after "set of" delete "din" and insert -- clip --.
Line 42, before "graphics data in which" delete "clinging" and insert -- clipping --.

Column 10,
Line 25, after "area is" delete "displayed" and insert -- to remain undisplayed --.

Signed and Sealed this

Eleventh Day of April, 2006

JON W. DUDAS
*Director of the United States Patent and Trademark Office*